(12) United States Patent
Kaufmann (10) Patent No.: US 8,512,616 B2
(45) Date of Patent: Aug. 20, 2013

(54) METHOD FOR PRODUCING A MULTILAYERED MOLDING

(75) Inventor: Georg Kaufmann, Fislisbach (CH)

(73) Assignee: Georg Kaufmann Formenbau AG, Busslingen (CH)

( * ) Notice: Subject to any disclaimer, the term of this patent is extended or adjusted under 35 U.S.C. 154(b) by 295 days.

(21) Appl. No.: 12/661,550

(22) Filed: Mar. 19, 2010

(65) Prior Publication Data

US 2010/0236700 A1   Sep. 23, 2010

(30) Foreign Application Priority Data

Mar. 20, 2009  (CH) ..................... 00545/09

(51) Int. Cl.
*B28B 7/22* (2006.01)

(52) U.S. Cl.
USPC ........................................ 264/255

(58) Field of Classification Search
USPC .......................................... 264/255
See application file for complete search history.

(56) References Cited

U.S. PATENT DOCUMENTS

| 5,618,477 A | * | 4/1997 | Suzuki | ........................ 264/46.5 |
| 6,982,021 B2 | | 1/2006 | Spengler | |
| 2004/0028769 A1 | * | 2/2004 | Kreager et al. | ............... 425/375 |

FOREIGN PATENT DOCUMENTS

EP   1 287 961   3/2003

* cited by examiner

*Primary Examiner* — Larry Thrower
(74) *Attorney, Agent, or Firm* — Collard & Roe, P.C.

(57) ABSTRACT

A method for producing a multilayered moulding (2), in particular a panelling element for a motor vehicle, forms an intermediate layer at least in some parts between a substrate layer (6) and a decorative layer (7). In this case the substrate layer (6) and the decorative layer (7) are arranged in a mould cavity (5) of a die (1), wherein at least in some sections between the substrate layer (6) and the decorative layer (7) at least one hollow cavity (9) is formed. After this the intermediate layer (8) is formed in the hollow cavity (9).

17 Claims, 6 Drawing Sheets

METHOD FOR PRODUCING A MULTILAYERED MOLDING

CROSS REFERENCE TO RELATED APPLICATIONS

Applicant claims priority under 35 U.S.C. §119 of Swiss Application No. 00545/09 filed Mar. 20, 2009.

BACKGROUND OF THE INVENTION

1. Field of the Invention

The invention relates to a method for producing a multilayered moulding, in particular a panelling element for a motor vehicle, in which between a substrate layer and a decorative layer an intermediate layer is formed at least in some areas.

2. The Prior Art

From EP 1 287 961 A2 a panelling element as well as a method and a device for producing multilayered panelling elements, in particular internal panelling elements for motor vehicles, are known. Said multilayered panelling element comprises at least one substrate layer, one decorative layer and a thermoplastic foamed plastic layer, which has partially at least one area of greater softness and/or a greater ability to absorb impact or greater material thickness. Said foamed plastic layer passes gradually with at least one edge part into the level of the foamed plastic layer having a uniform thickness. In this case to form the area of greater material thickness firstly a blank of a thermoplastic foamed plastic section is fixed additionally onto the foamed plastic layer arranged between the decorative and substrate layer and afterwards is shaped by pressure and heat to shape the parts. In this case the blank or the foamed plastic section formed therefrom is designed to have at least one gradually outrunning edge part and is connected at the same time thermoplastically with the formed plastic layer and the substrate layer. Said shaping and joining procedure is performed by means of the heat of the previously heated substrate layer.

SUMMARY OF THE INVENTION

The problem addressed by the present invention is a method for producing a multilayered moulding with an intermediate layer arranged in areas between a substrate layer and a decorative layer, in which the intermediate layer can be formed simply and inexpensively.

Said problem of the invention is solved in that the substrate layer and the decorative layer are arranged and held in a mould cavity of a die, wherein at least in some areas between the substrate layer and the decorative layer a hollow cavity is formed and afterwards the intermediate layer is formed in the hollow cavity.

The advantage of the procedure according to the invention is that the possibility is provided in several steps of defining the desired shaping of both the decorative layer and the substrate layer, and only afterwards forming the intermediate layer in the intended thickness and hardness in places positions determined for this. By means of the arrangement of the substrate layer and the decorative layer inside the mold cavity a corresponding hollow cavity can be formed between said two layers in positions provided therefor, which hollow cavity is used for the intermediate layer to be formed. As the substrate layer and the decorative layer cover substantially the entire wall area of the mold cavity, the material for forming the intermediate layer during its formation does not comes into contact or only comes partly into contact with the mold walls, as it is formed inside the hollow cavity or cavities between the two layers.

An advantage of the selected method steps according to an embodiment is that in this way in an independent procedure the shape of the generally stable substrate layer can be defined and designed simply and inexpensively.

Furthermore, a procedure according to the features another embodiment is advantageous, as it provides the option of leaving the produced substrate layer on one of the mold halves and introducing by means of an additional nozzle in a later procedure the material for forming the intermediate layer into the hollow cavity between the substrate layer and the decorative layer.

By a further advantageous procedure, in the region of the nozzle side complex sealing mechanisms for the sprue opening become unnecessary during the formation of the substrate layer in the mold cavity and despite this a reliable seal can be provided until the release of the sprue opening of the additional nozzle.

A variant of the method is also advantageous, because in this way the mixing of different materials can be avoided during the manufacturing process of the substrate layer. At the same time in this way also the blocking of the sprue opening of the additional nozzle is prevented until its release.

An advantage of the selected method steps according to another embodiment is that the option is provided of leaving the produced substrate layer in the region of the die half and in a subsequent procedure through said passage to have access to the hollow cavity or cavities formed between the layers for the introduction of the material to form the intermediate layer.

Furthermore, a procedure according to another embodiment is advantageous, as it provides for the final finishing procedure a decorative layer with a defined dimensional shape.

By a further advantageous procedure, it is possible in the smallest space to produce precisely coordinated individual components, namely the substrate layer and the decorative layer, separately from one another and immediately after their shaping procedure to produce the final molding from the latter.

A variant of the method is also advantageous, because in this way after the formation of the individual layers the latter are arranged in their predetermined end position in the mold cavity for the final formation of the desired molding for the introduction of the material for forming the intermediate layer.

In the selected method steps according to another embodiment it is advantageous that also during the formation of the intermediate layer a relative positioning of the decorative layer and/or the substrate layer to one another is made possible.

Furthermore, a procedure according to another embodiment is advantageous, as in this way following on from the simultaneous production of the decorative layer and the substrate layer by means of a simple translatory movement the two layers can be moved into the joint hollow cavity. In this way there is no need for further handling of the decorative layer and the substrate layer and they can remain in the mold halves provided until the final formation of the molding in the corresponding mold halves.

In a further advantageous procedure, a simple sliding displacement movement is sufficient and with relatively little effort a precise formation of the final molding is made possible.

Also a variant of the method is advantageous, as in this way it is made possible in a simple manner to adjust the elasticity and resilience in sections to the respective desired requirements. Furthermore, in this way also gentle transitions from harder sections of the moulding to sections of a greater elasticity or softness can be obtained. In this way also areas of varying hardness and/or resilience properties are created.

In a further advantageous procedure, over the entire surface extension of facing surfaces of the substrate layer and the decorative layer a simply formed connection and associated adhesion can be formed between said layers. In this way additional joining processes, such as e.g. gluing, become unnecessary and after the formation of the intermediate layer a component can be removed from the die which holds its shape.

An advantage of the selected method steps according to another embodiment is that cutting processes can be avoided and yet the hollow cavity or cavities between the two layers can be filled. In this way the hollow cavity or cavities can be filled simply and completely with the material for forming the intermediate layer.

Furthermore, a procedure according another embodiment is advantageous, because it is possible thereby to prevent material for forming the intermediate layer from coming directly into contact with the walls of the mould cavity. In this way separating agents need not be used in the individual materials. Furthermore, also the need for cleaning is also reduced in this way, which means the die has a longer service life until the next standard inspection is needed.

In a further advantageous procedure, in a simple manner different requirements can be taken into account.

A variant of the method is also advantageous, because in this way the appearance and look of the entire molding can be changed in a simple manner.

Lastly however, a procedure is possible as in this way complex cutting processes for the intermediate layer can be omitted and the hollow cavity provided for holding the intermediate layer can be filled completely between the layers.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

In FIGS. 1 to 9 in simplified form a die 1 is shown for producing an in particular multilayered moulding 2. Said multilayered moulding 2 is used in particular as a panelling element for motor vehicles as internal panelling. In this way the die structure of the moulding die 1 is simplified and also the subsequent manufacturing process can be made much less expensive and easier to conduct.

Figure 1:
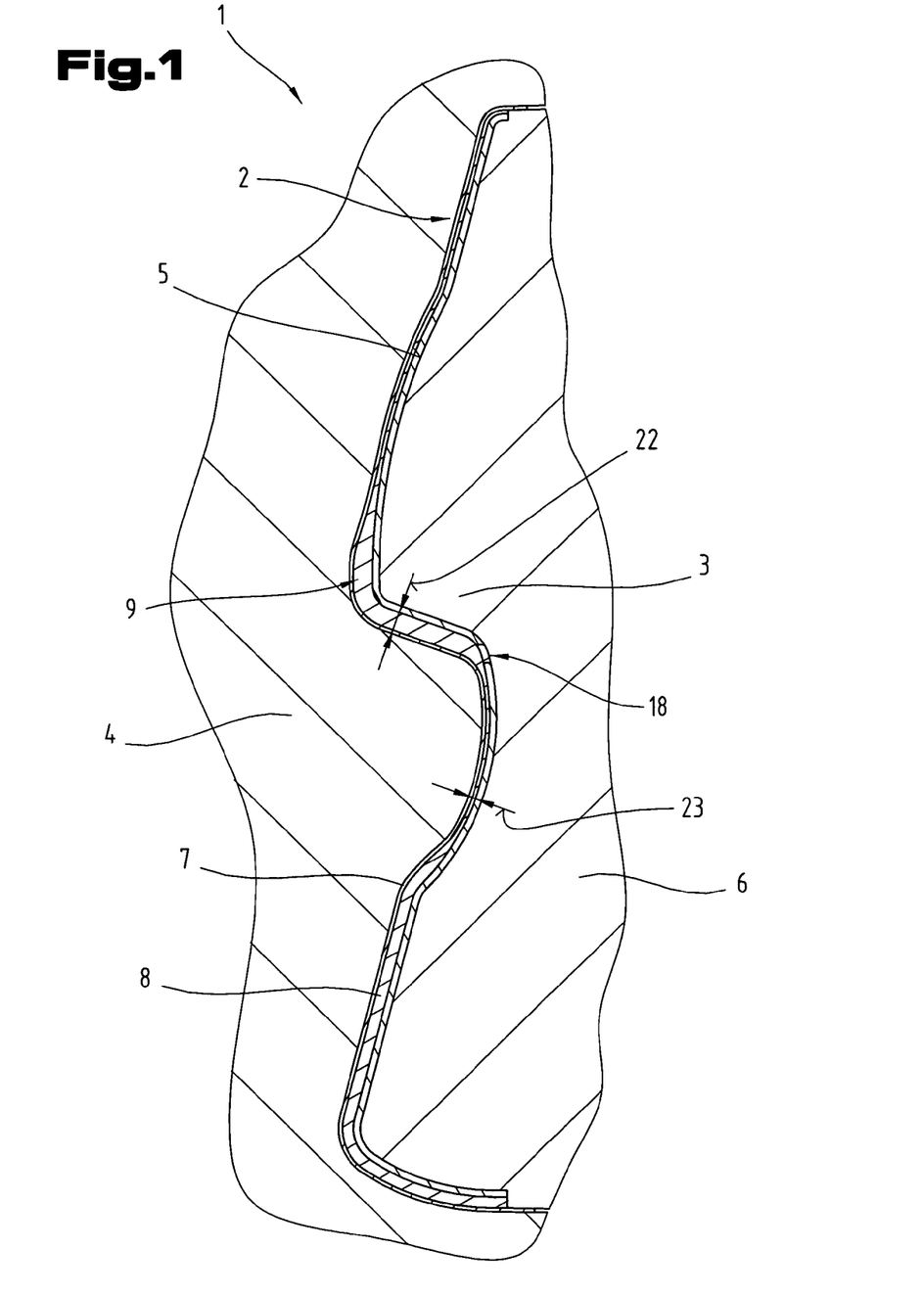
FIG. 1 shows a cross section of a moulding produced according to the invention with a partly schematically indicated die.

As can best be seen from FIG. 1, the die 1 can comprise at least one stamping element 3 and at least one lower die element 4. Between the stamping element 3 and lower die element 4 in a closed die 1 a hollow cavity 5 is formed, which is defined in its dimensional shape by corresponding mould walls or faces of the stamping or die element 3, 4.

The moulding 2 to be produced has a multilayered structure. Preferably, the moulding 2 comprises at least one substrate layer 6, at least one decorative layer 7 and an intermediate layer 8 arranged at least in some areas between the substrate layer 6 and the decorative layer 7.

For the manufacturing process of the moulding 2 both the substrate layer 6 and the decorative layer 7 are arranged in the mould cavity 5 and between the latter at predetermined points where the intermediate layer 8 is to be formed a hollow cavity 9 is provided or formed. By means of the arrangement of the substrate layer 6 and the decorative layer 7 in the region of the mould walls of the die 1 and the hollow cavity 9 or hollow cavities formed at least in some areas in between, during the introduction and formation of the intermediate layer 8 there is no contact of the material provided therefor with the walls of the die 1, so that there is no need for suitable separating agents or additional cleaning processes. In this way the intervals between service maintenance can be lengthened and specific standard maintenance can take place at longer time intervals, which results in greater productivity for the die 1. The introduction and formation of the intermediate layer 8 is described in the following in more detail.

Figure 2:
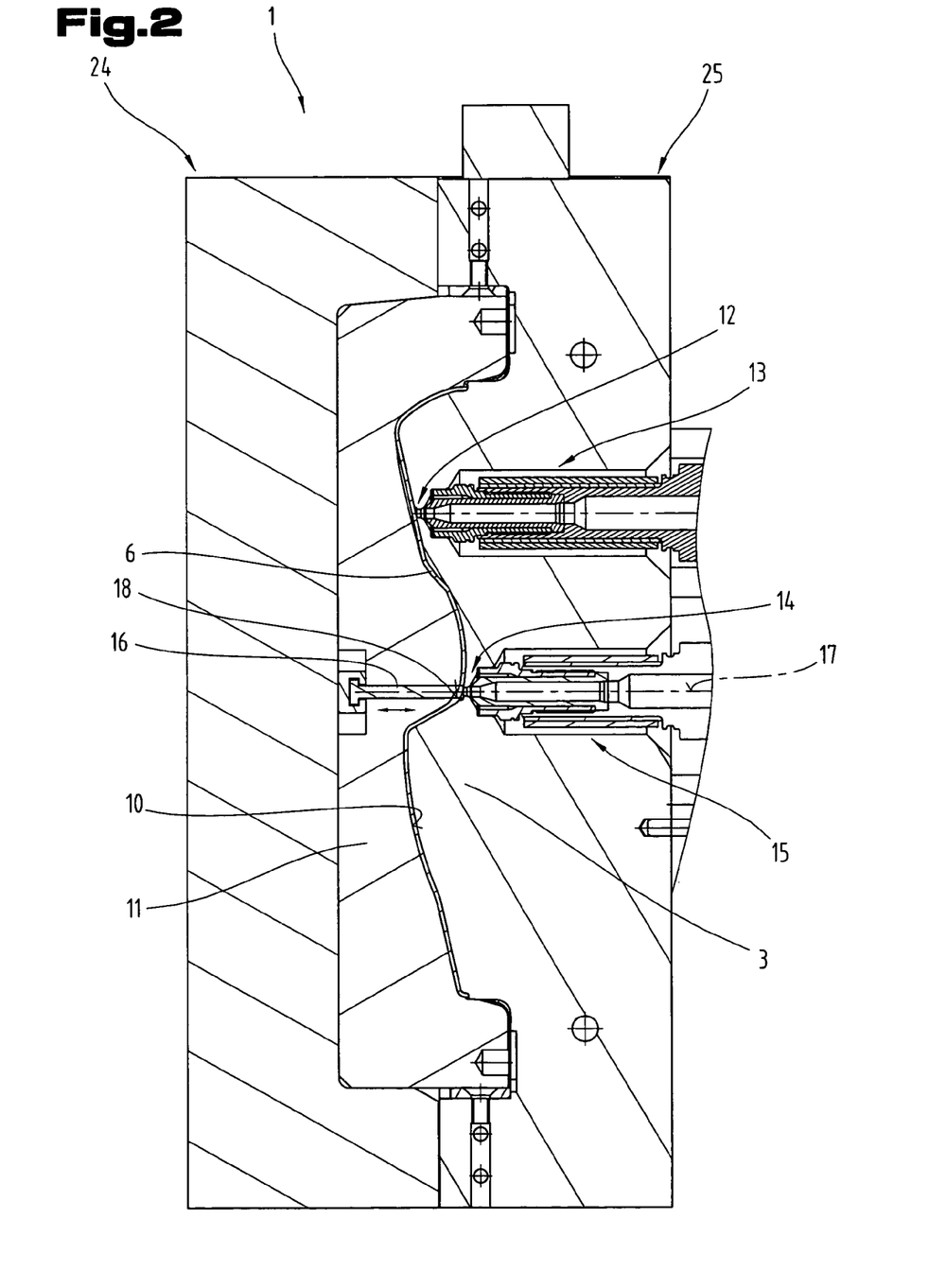
FIG. 2 shows a portion of the die for producing the substrate layer of the moulding.

As can best be seen from FIG. 2, the die 1 for forming the substrate layer 6 can have its own additional mould cavity 10. Said mould cavity 10 can be delimited by the previously described stamping element 3 or also by an independently arranged additional stamping element and an additional lower die element 11. In the closed position of the mould cavity 10 via a first sprue opening 12 a first nozzle 13 enters into the mould cavity 10 to form the substrate layer 6. The production of the substrate layer 6 is performed here by an injection moulding process in a known manner. It would also be possible however independently of this to form a substrate layer 6 in a different manner and then arrange the latter together with the decorative layer 7 for the formation of the intermediate layer 8 in the mould cavity 5.

It is also shown in FIG. 2 that in the same mould cavity 10 or later in the common cavity 5, a second or additional sprue opening 14 of a second or additional nozzle 15 opens, which is intended for producing or forming the intermediate layer 8 to be inserted. In order to avoid the closing of the sprue opening 14 during the manufacturing process of the substrate layer 6 with its material, it is advantageous if said additional sprue opening 14 can be closed if necessary by means of a positioning element 16 passing through the mould cavity 10. The positioning element or elements 16 can in this case also be defined as slide elements or closing elements. In this case the positioning element 16 is preferably designed in the form of a pin and is mounted adjustably or guided in addition in this exemplary embodiment shown in axial direction with respect to a nozzle axis 17 of the nozzle 15 in the lower die element 11 in the direction of the nozzle axis 17. It would also be possible to have a different alignment of the positioning element 16 than the one described above. The closing of the further sprue opening 14 can also be performed in an angular direction relative to the nozzle axis 17, whereby e.g. a perpendicular alignment to the latter would be possible. This can be the case if a translation of the lower die element 11 is not favourable or not possible. Thus the positioning element 16 is arranged on the side of the mould cavity 10 opposite the additional nozzle 15. Before commencing the manufacturing process of the substrate layer 6 the positioning element 16 is moved towards the further sprue opening 14 and its opening is closed tightly by the positioning element 16. As the positioning element 16 projects from the opposite side to the additional nozzle 15, also in this area of the mould cavity 10 is penetrated or passed through by the positioning element 16. In this way during the formation of the formation of the substrate layer 6 within the latter an opening 18 is formed. Said opening 18 is also shown in simplified form in FIG. 1 and is used for the later introduction of the material for forming the intermediate layer 8 between the substrate layer 6 and the decorative layer 7.

If several independent hollow cavities 9 are provided a separate nozzle 15 as well as a positioning element 16 can be assigned to each of the latter. If a full surface introduction of the intermediate layer 8 is desired, a cohesive hollow cavity 9 with a preferably varying thickness or width can be formed between the two layers 6, 7.

Figure 3:
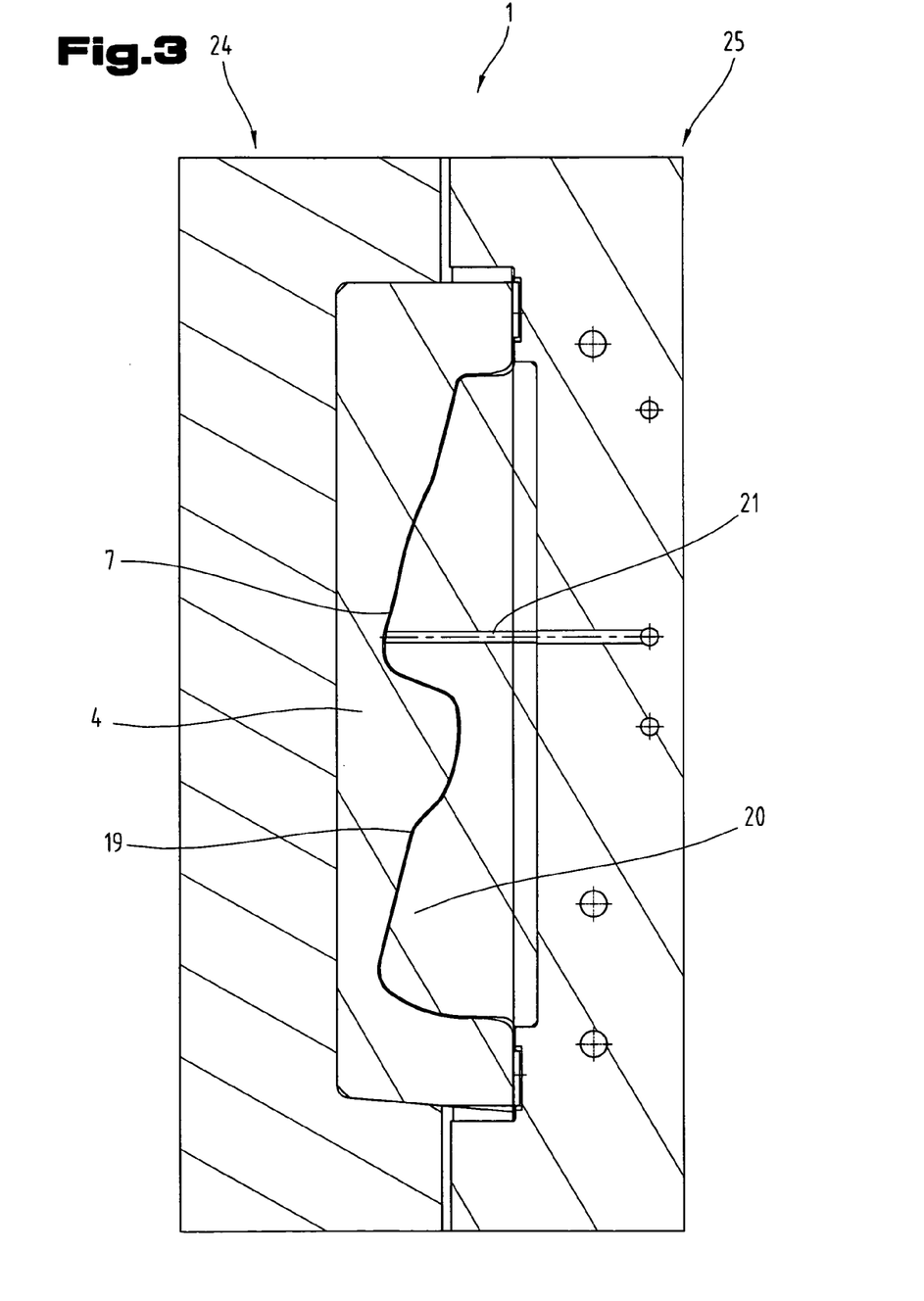
FIG. 3 shows a further portion of the die for producing the decorative layer of the moulding.

FIG. 3 illustrates in a simplified form the shaping of the decorative layer 7, whereby the latter for example can be performed in the same die 1, but in separate mould cavities 19 between the die element 4 and a stamping element 20.

The decorative layer 7 can in turn be made from an organic and/or metal material. From said materials preferably mostly permanently, in particular thermally deformable films or correspondingly equipped decorative materials, fabrics, weaves, knitted fabrics or fleeces are formed. In this case natural and/or artificial threads or fibres can be used. Also any combination of the different materials as well as the starting materials formed therefrom would be possible. For a simpler shaping of the decorative layer 7 at least one suction line 21 can open into the mould cavity 19, which is in connection with a not shown vacuum generator or suction pump. In this way when closing the mould cavity 19 any available air can be suctioned off and the decorative layer 7 to be shaped can be placed against the mould walls of the lower die element or stamping element 20, in particular suctioned. By means of this procedure the decorative layer 7 is shaped in the mould cavity 19 to the predefined dimensional shape. This can be performed by a thermal shaping procedure. Preferably however, the production of the substrate layer 6 as well as the shaping of the decorative layer 7 in a common die 1 is performed simultaneously, where this is performed in spatially separate first and second mould cavities 10, 19. In corresponding outlines this is explained in more detail in the following.

Following the shaping of the decorative layer 7 and the production of the substrate layer 6 the latter are arranged in the common mould cavity 5, as shown in FIG. 1. In this case the joint mould cavity 5 in this exemplary embodiment is formed on the one hand by the stamping element 3 for producing or forming the substrate layer 6 and on the other hand by the lower die element 4 for producing or preforming the decorative layer 7. This is performed by a mutual offsetting of the stamping or lower die elements relative to one another.

If the substrate layer 6 and the decorative layer 7 are arranged in a joint mould cavity 5 it is advantageous if the latter are also held in position there.

As can be seen best from FIG. 1, the hollow cavity 9 arranged or formed between the decorative layer 7 and the substrate layer 6 for mounting or forming the intermediate layer 8 can be designed to have a thickness 22, 23 and/or surface extension that varies over its surface extension. In this way it is possible at predefined points to achieve a variable elasticity or flexibility and the associated softness of the moulding 2 at the points determined for this. By making a different selection of materials for forming the intermediate layer 8 and arrangement of the latter on the moulding 2 to be produced, it is possible to adjust the moulding 2 individually to different conditions of use. If soft and elastically deformable sections are required, gases, liquids, gels or the like can also be added between the two layers 7, 8. In this case the density of the two layers 7, 8 should be relative to the gas and/or liquid density. In this way a so-called "padding-effect" can be obtained.

Preferably, the intermediate layer 8 is also formed by a separate injection procedure in the hollow cavity 9, whereby the latter can best be seen from FIG. 2. This is performed by means of the second nozzle 15 and the sprue opening 14 in connection with the mould cavity 5 via the opening 18.

If both the substrate layer 6 and the decorative layer 7 are produced or shaped simultaneously in one step, as already described above, after opening the die 1 the substrate layer 6 located on the stamping element 3 can remain stationary and for example decorative layer 7 preformed in the die part 4 can be moved by means of translatory movement towards the stamping element 3. After closing the die 1 in this position the common mould cavity 5 is defined and afterwards the shaping and insertion of the material for forming the intermediate layer 8 can commence. Said insertion or shaping of the intermediate layer 8 can also be performed preferably by an injection procedure. This is possible in that the second nozzle 15 is in flow-connection with the hollow cavity 9 via the passage or passages arranged in the substrate layer 6.

Preferably, the substrate layer 6 can be made from a thermoplastic material selected from a group comprising polypropylene (PP), polyethylene (PE), polyamide (PA), acrylonitrile-utadiene-styrene (ABS) and a polycarbonate-acrylonitrile-butadiene-styrene blend (PC-ABS blend).

The material forming the intermediate layer 8 can be made in particular from a foaming and/or expanding plastic material, such as for example a plastic foam, the latter being selected from a group comprising polyurethane (PU) and a thermoplastic elastomer (TPE). The term "foaming" or "expanding" is understood to mean that the volume of the material introduced into the cavity 9 increases or the latter compacts in porosity. Also a polymer material would be possible, which can be used both in the foamed or non-foamed state. If a plastic foam is selected, the latter is inserted in a flowable state into the cavity 9 and foams up accordingly until the latter reaches its hardened state. By means of the intermediate layer 8 the connection is formed between the substrate layer 6 and the decorative layer 7, whereby the latter is dependent on the materials or a combination thereof forming the intermediate layer 8. Mostly, elastically deformable materials are used for the intermediate layer 8, whereby however any combination of the latter can be used in different sections or cavities 9. Said materials can be selected to have a very low modulus of elasticity up to a high modulus of elasticity. If for example inelastic deformable materials are used for the intermediate layer 8, the latter provide effective protection against impact for converting kinetic energy in case of accident. The lower the module of elasticity the more elastic and softer the intermediate layer 8 can be. The latter can have a softer support area e.g. for an arm-rest.

In FIGS. 4 to 9 in a simplified form the die 1 for producing the moulding 2 is shoWn in a much simplified schematic view in the various consecutive steps. This is only one example of a plurality of other options and at the end of the description another possibility is referred to in brief.

Figure 4:
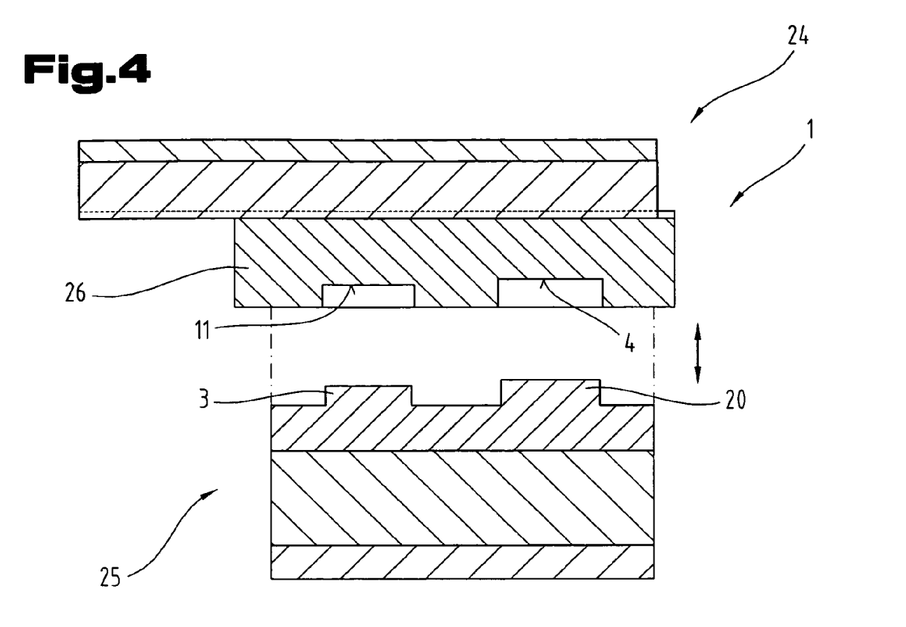
FIG. 4 shows the die in the opened position before the start of the production process of the moulding.

Thus in FIG. 4 the die 1 is shown in the opened position of its mould halves 24, 25. For simplicity in the following description the die half 24 arranged at the top is defined as a upper die half and the die half 25 arranged at the bottom is defined as the lower die half. In this case it should be mentioned that both the die 1 and the mould halves 24, 25 forming the latter are represented in a much simplified form and symbolically and for a better overview details have been omitted. In this case any other orientation of the two mould halves 24, 25 relative to one another is possible.

In FIG. 4 the die 1 is shown in its opened position and thus with the mould halves 24, separated from one another. In this die 1 shown here in a procedure after closing the mould halves 24, 25 on the one hand the substrate layer 6 and on the other hand the decorative layer 7 are formed simultaneously or preformed. For the shaping or formation of the decorative layer 7 the lower die element 4 is provided in the region of the upper die half 24 and the stamping element 20 is provided in the lower die half 25. The latter are represented in simplified form in the right part of the die 1. To form the substrate layer 6 the lower die element 11 is provided in the upper die half 24 and the stamping element 3 is provided in the lower die half 25, whereby the latter are shown on the left part of the die 1. The two mould halves 24, 25 are mainly stationary and arranged fixed in relation to one another, whereby in this exemplary embodiment in the region of the upper die half 24 the two lower die elements 4, 11 are arranged or formed in a separate displaceable die part 26. Preferably, said die element 26 is part of the otherwise fixed upper die half 24 apart from during opening process and is preferably arranged or guided to be longitudinally displaceable relative to the latter.

Figure 5:
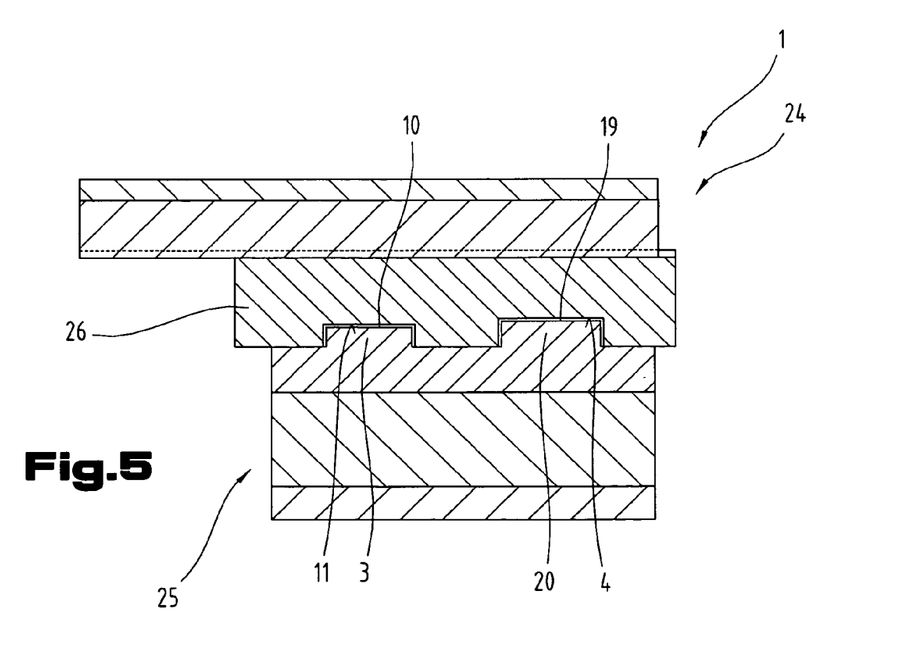
FIG. 5 shows the die according to FIG. 4 in the closed first position for the simultaneous formation of the decorative layer and the substrate layer.

In FIG. 5 the die 1 is shown with closed mould halves 24, 25, wherein in the area between the lower die element 4 and the stamping element 20 the mould cavity 19 is designed to shape the decorative layer 7. To secure and form the dimensional shape of the substrate layer 6 the lower die element 11 and the stamping element 3 delimit the mould cavity 10. In said closed die position the two layers 6, 7 are formed and produced simultaneously.

Figure 6:
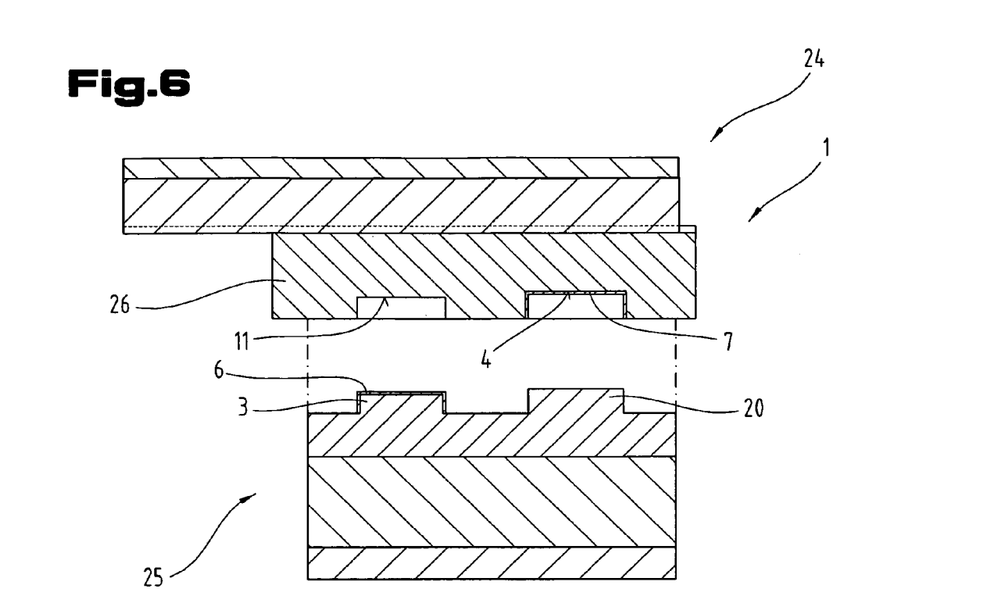
FIG. 6 shows the die according to FIGS. 4 and 5 in a reopened position and formed decorative layer and substrate layer.
Figure 7:
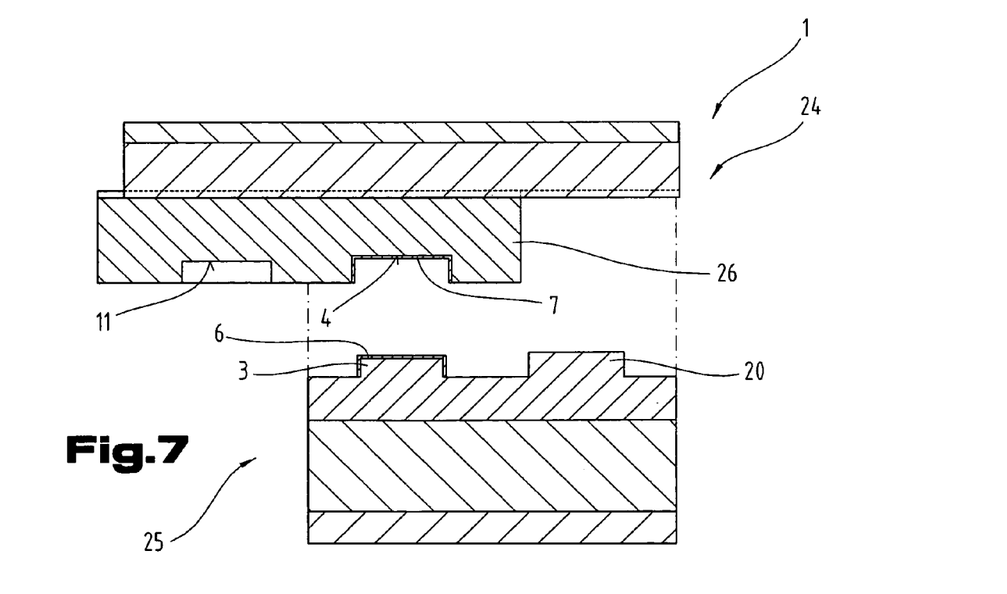
FIG. 7 shows the die according to FIGS. 4 to 6, but with an offset die element.

In FIG. 6 after the joint manufacturing process the die 1 is shown again in an opened position, wherein the die part 26 with its lower die element 4 arranged therein mounts or secures the decorative layer preformed there. The substrate layer 6 however remains fixed here on the stamping element 3.

In FIG. 7 the die 1 is shown again in its opened die position, in which in contrast to FIG. 6 the die part 26 with the decorative layer 7 held in the die part 4 is shown to be offset, so that the die part 4 is arranged or aligned in its position corresponding to the stamping element 3 and the substrate layer 6 arranged thereon.

Figure 8:
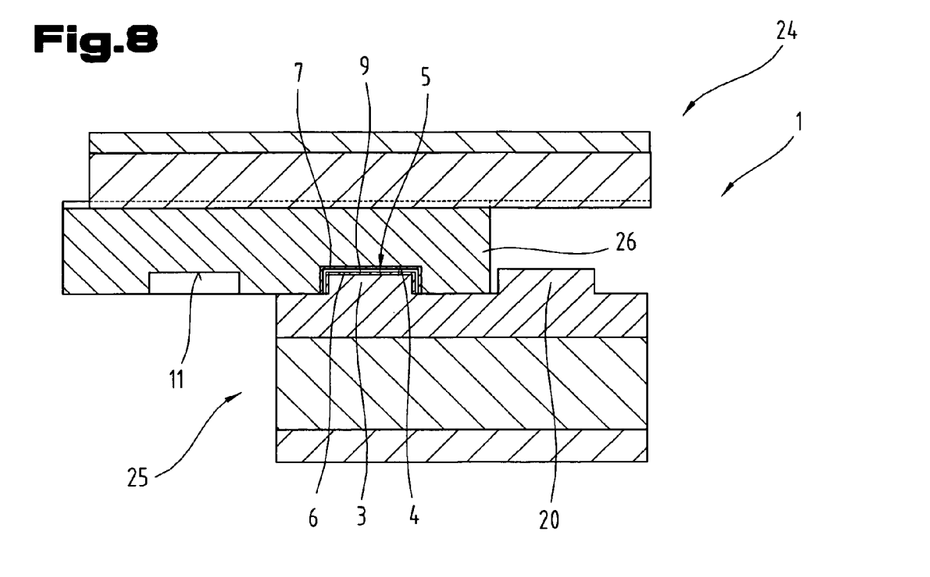
FIG. 8 shows the die according to FIGS. 4 to 7 in a further closed position for forming the intermediate layer.

In this position the die 1 is closed again, as shown in FIG. 8. In this way the die part 4 with the decorative layer 7 mounted therein as well as the stamping element 3 with the substrate layer 6 arranged thereon form the joint mould cavity 5. This situation is also shown in simplified form in FIG. 1. In this case, as already described, between the decorative layer 7 and the substrate layer 6 at least one hollow cavity 9 is formed, in which at least in some parts the intermediate layer 8 is formed or inserted.

Figure 9:
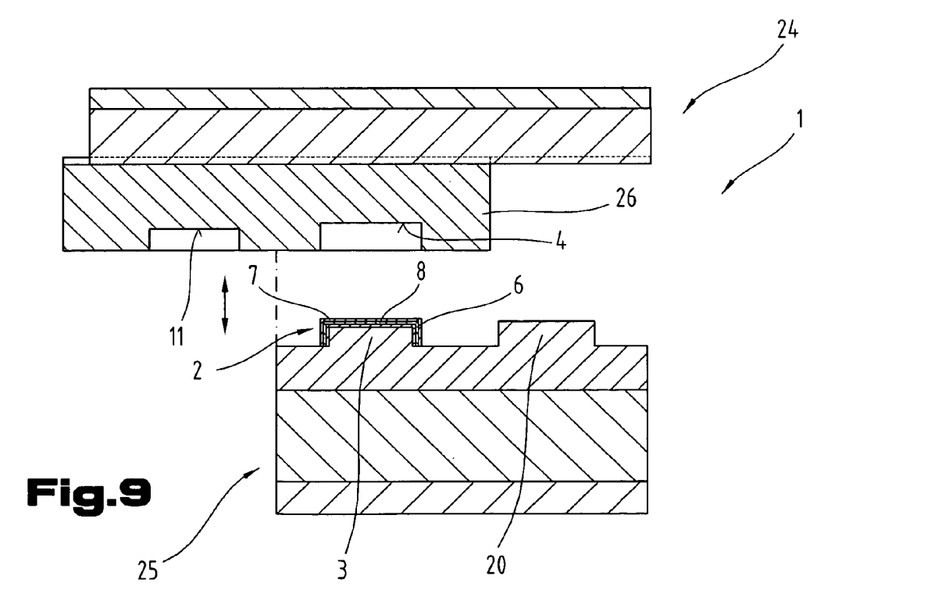
FIG. 9 shows the die according to FIGS. 4 to 8, in a reopened position for removing the produced moulding.

Lastly, the die 1 is shown in FIG. 9 after the production of the entire moulding 2, wherein in the reopened position the latter can be removed from the common mould cavity 5.

After removing the produced moulding 2 the die element 26 is moved back into the position shown in FIG. 4 and a new process of making the moulding 2 can be carried out.

The previously described mutual displacement of the lower die element 4 and stamping element 3 can also be performed in any other sequence and also in reverse. It would also be possible to produce the substrate layer 6 and the decorative layer 7 respectively in independently designed dies and then either bring them together in a further joint die and form the intermediate layer 8 there or only join together corresponding die halves to form a joint mould cavity 5.

As already indicated briefly it would also be possible to arrange the individual moulds or die cavities for forming the moulding 2 on a not shown round or rotary table and to provide the corresponding additional stations around the round table. Thus at a first station the decorative layer 7 to be shaped can be inserted. At a following second station the shaping is then performed. Afterwards or simultaneously to the shaping of the decorative layer 7 the substrate layer 6 can be formed. In this way the substrate layer 6 can either be formed directly on the decorative layer 7 or also in parallel in a separate mould, and then can be brought into the joint mould cavity 5 with the decorative layer 7. In a subsequent step the intermediate layer 8 is produced and formed, as already described above. Then the moulding 2 is complete and can be removed from the round table. By using the round table with each working cycle at the beginning of the production process there is a new start, whereby in a continual process the productivity of the entire installation can be increased.

The exemplary embodiments show possible embodiment variants of the die 1 and the moulding 2 produced therewith, whereby it should be noted at this point that the invention is not restricted to the embodiment variants shown here in particular, but rather various different combinations of the individual embodiment variants are also possible and this variability, due to the teaching on technical procedure, lies within the ability of a person skilled in the art in this technical field. Thus all conceivable embodiment variants, which are made possible by combining individual details of the embodiment variants shown and described, are also covered by the scope of protection.

Finally, as a point of formality, it should be noted that, for a better understanding of the structure of the die 1 and the moulding 2 produced therewith, the latter and its components have not been represented true to scale in part and/or have been enlarged and/or reduced in size.

The problem addressed by the independent solutions according to the invention can be taken from the description.

Mainly, the individual embodiments shown in FIGS. 1; 2; 3; 4 to 9 can form the subject matter of independent solutions according to the invention. The problems and solutions according to the invention relating thereto can be taken from the detailed descriptions of these figures.

Although only a few embodiments of the present invention have been shown and described, it is to be understood that many changes and modifcations may be made thereunto without departing from the spirit and scope of the invention.

The invention claimed is:

1. Method for producing a multilayered molding, in which between a substrate layer and a decorative layer at least in some parts an intermediate layer is formed, wherein the substrate layer and the decorative layer are arranged in a first mold cavity of a die, wherein in at least some areas between the substrate layer and the decorative layer at least one hollow cavity is formed and the intermediate layer is formed afterwards in the hollow cavity, wherein in a second mold cavity of the die the substrate layer is formed by an injection molding process via a first nozzle opening into the second mold cavity and comprising a first sprue opening, and wherein into the second mold cavity a second sprue opening of a second nozzle opens, whereby the second sprue opening is designed to be closable by a pin-like positioning element passing through the second mold cavity.

2. Method according to claim 1, wherein the pin-like positioning element is mounted axially adjustably relative to the additional nozzle on the side of the second mold cavity opposite the second nozzle.

3. Method according to claim 1, wherein during the injection molding process for producing the substrate layer the second sprue opening of the second nozzle is closed by the pin-like positioning element.

4. Method according to claim 1, wherein an opening is formed in the substrate layer by the pin-like positioning element passing through the second mold cavity.

5. Method according to claim 1, wherein the decorative layer is shaped in a third mold cavity to a predefined dimensional form.

6. Method according to claim 5, wherein production of the substrate layer and shaping of the decorative layer is performed simultaneously in a common die in the spatially separate second and third mold cavities.

7. Method according to claim 1, wherein following shaping of the decorative layer as well as formation of the substrate layer the decorative layer and the substrate layer are arranged in the first mold cavity.

8. Method according to claim 1, wherein the decorative layer and/or the substrate layer are held in position in the first mold cavity.

9. Method according to claim 1, wherein a lower die element of the die receiving the shaped decorative layer after opening the die is moved towards a stamping element of the die receiving the substrate layer and afterwards the die is closed again.

10. Method according to claim 9, wherein the translatory movement during the displacement of the lower die part is performed by a linear movement of a die element of the die.

11. Method according to claim 1, wherein the hollow cavity arranged between the decorative layer and the substrate layer is designed to have a thickness that varies over surface extensions of facing surfaces of the decorative layer and the substrate layer.

12. Method according to claim 1, wherein the hollow cavity arranged between the decorative layer and the substrate layer is formed over an entirety of a surface extension of the molding.

13. Method according to claim 4, wherein the intermediate layer is formed by an injection process into the hollow cavity.

14. Method according to claim 13, wherein the injection process is performed through the opening formed in the substrate layer, which connects with the hollow cavity.

15. Method according to claim 1, wherein the substrate layer is selected from a group of materials comprising polypropylene, polyethylene, polyamide, acrylonitrile-butadiene-styrene, and polycarbonate-acrylonitrile-butadiene-styrene blend.

16. Method according to claim 1, wherein the decorative layer is made from an organic and/or metal material.

17. Method according to claim 1, wherein the intermediate layer is made from a foamable plastic material.

\* \* \* \* \*